US011051088B2

United States Patent
Lisewski

(10) Patent No.: US 11,051,088 B2
(45) Date of Patent: Jun. 29, 2021

(54) LIGHT CHARGING SYSTEM FOR WIRELESS ALARM DETECTORS

(71) Applicant: CARRIER CORPORATION, Palm Beach Gardens, FL (US)

(72) Inventor: Tomasz Lisewski, Gdansk (PL)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/717,086

(22) Filed: Dec. 17, 2019

(65) Prior Publication Data

US 2020/0221192 A1    Jul. 9, 2020

Related U.S. Application Data

(60) Provisional application No. 62/790,107, filed on Jan. 9, 2019.

(51) Int. Cl.
| | | |
|---|---|---|
| *H02J 7/00* | (2006.01) | |
| *H04Q 9/02* | (2006.01) | |
| *G08B 13/04* | (2006.01) | |
| *G08B 13/196* | (2006.01) | |
| *G08B 29/18* | (2006.01) | |

(52) U.S. Cl.
CPC .............. *H04Q 9/02* (2013.01); *G08B 13/04* (2013.01); *G08B 13/19619* (2013.01); *G08B 13/19626* (2013.01); *G08B 29/181* (2013.01); *H02J 7/00* (2013.01); *H04Q 2209/886* (2013.01)

(58) Field of Classification Search
CPC ........... F21L 4/08; G08B 13/00; G08B 13/02; G08B 13/16; G08B 13/18; G08B 13/181; H02J 7/00
See application file for complete search history.

(56) References Cited

U.S. PATENT DOCUMENTS

| | | | |
|---|---|---|---|
| 10,062,254 B1 | 8/2018 | Paul | |
| 10,476,296 B1* | 11/2019 | Rausch | .................... H02S 40/22 |
| 2010/0100514 A1* | 4/2010 | Raymond | ............ G06K 9/6271 |
| | | | 706/20 |
| 2010/0127657 A1 | 5/2010 | Lin et al. | |
| 2011/0260880 A1 | 10/2011 | Dean et al. | |
| 2019/0132815 A1* | 5/2019 | Zampini, II | ........... G06Q 50/06 |

FOREIGN PATENT DOCUMENTS

| | | |
|---|---|---|
| EP | 0111632 A1 | 6/1984 |
| EP | 3396339 A1 | 10/2018 |
| WO | 2008133514 A1 | 11/2008 |

OTHER PUBLICATIONS

Partial European Search Report for European Application No. 20151016.1 dated May 29, 2020.
European Search Report for European Application No. 20151016.1 dated Sep. 2, 2020.

\* cited by examiner

*Primary Examiner* — Benyam Haile
(74) *Attorney, Agent, or Firm* — Carlson, Gaskey & Olds, P.C.

(57) ABSTRACT

A detector includes a housing having a window. A detection engine is configured to detect an event external to the housing. A battery is connected to the detection engine and configured to supply power thereto. A solar cell is configured to generate electricity when exposed to a light received through the window. The solar cell is arranged in the housing and electrically connected to the battery.

13 Claims, 2 Drawing Sheets

LIGHT CHARGING SYSTEM FOR WIRELESS ALARM DETECTORS

CROSS-REFERENCE TO RELATED APPLICATIONS

This application claims priority to U.S. Provisional Application No. 62/790,107, which was filed on Jan. 9, 2019, and is incorporated herein by reference.

BACKGROUND

This disclosure relates to an alarm system and its detector, and, more particularly, an arrangement and method for charging a battery in the detector.

A typical smoke or fire alarm is typically hardwired into a building during construction to continuously supply power to the detectors. These detectors have a battery backup. When the battery voltage is undesirably low, the detector may chirp, alerting the occupant that the battery needs to be changed.

Many detectors used for alarm systems, such as burglar alarms, are wireless rather than hardwired as they are installed after construction of the building. These alarm detectors are energized by an internal energy storage device, such as a battery. Each detector has a limited battery lifetime. Sending large amounts of data (for example, audio or video) at a long distance or fast digital signal processing consumes a lot of energy, depleting the battery relatively quickly. As a result, the alarm's battery must be changed frequently.

SUMMARY

In one exemplary embodiment, a detector includes a housing having a window. A detection engine is configured to detect an event external to the housing. A battery is connected to the detection engine and configured to supply power thereto. A solar cell is configured to generate electricity when exposed to a light received through the window. The solar cell is arranged in the housing and electrically connected to the battery.

In a further embodiment of the above, the window is a convex lens configured to concentrate the light onto the solar cell.

In a further embodiment of any of the above, the solar cell is a photovoltaic cell.

In a further embodiment of any of the above, the detection engine includes an alarm and a sensor in communication with a controller. The sensor is configured to detect an event corresponding to at least one of a glass breakage, a vibration, a motion and/or a noise. The controller activates the alarm in response to the event.

In a further embodiment of any of the above, the controller is in communication with the battery and the solar cell. The controller is configured to generate an ON command in response to a low battery condition associated with the battery and/or a low-light condition detected by the solar cell.

In a further embodiment of any of the above, the detector includes a mirror arranged within the housing. The mirror is oriented to direct the light from the window onto the solar cell.

In another exemplary embodiment, an alarm system includes a light source. A light switch is in communication with the light source and configured to increase light from the source in response to an ON command. A detector includes a housing having a window. A detection engine is configured to detect an event external to the housing. The detection engine is in communication with the light switch. A battery is connected to the detection engine and configured to supply power thereto. A solar cell is configured to generate electricity when exposed to a light received through the window. The solar cell is arranged in the housing and electrically connected to the battery. The detection engine is configured to send the ON command to the light switch in response to a low battery condition associated with the battery and/or a low-light condition detected by the solar cell.

In a further embodiment of any of the above, the window is a convex lens configured to concentrate the light onto the solar cell.

In a further embodiment of any of the above, the solar cell is a photovoltaic cell.

In a further embodiment of any of the above, the detection engine includes an alarm and a sensor in communication with a controller. The sensor is configured to detect an event corresponding to at least one of a glass breakage, a vibration, a motion and/or a noise. The controller activates the alarm in response to the event.

In a further embodiment of any of the above, the detection engine includes a controller configured to send an OFF command to the light switch in response to the battery achieving a desired charge.

In a further embodiment of any of the above, the alarm system includes a mirror arranged within the housing. The mirror is oriented to direct the light from the window onto the solar cell.

In a further embodiment of any of the above, the light command is a wireless signal to the light switch.

In another exemplary embodiment, a method of operating an alarm detector includes powering a detection engine with a rechargeable battery. The detection engine is configured to detect an event corresponding to at least one of a glass breakage, a vibration, a motion and/or a noise. The battery is recharged with a solar cell.

In a further embodiment of any of the above, the method includes turning on a light source with the detection engine in response to a low battery condition associated with the battery and a low-light condition detected by the solar cell.

In a further embodiment of any of the above, the turning on step is performed wirelessly.

In a further embodiment of any of the above, the recharging step includes concentrating a light onto the solar cell.

In a further embodiment of any of the above, the detection engine includes an alarm and a sensor in communication with a controller. The method includes the steps of detecting with the sensor an event that corresponds to at least one of a glass breakage, a vibration, a motion and/or a noise. The alarm is activated in response to the event.

In a further embodiment of any of the above, the method includes the step of sending an OFF command to a light switch in response to the battery achieving a desired charge.

In a further embodiment of any of the above, the recharging step includes directing a light onto a mirror and reflecting the light with the mirror onto the solar cell.

These and other features of the present invention can be best understood from the following specification and drawings, the following of which is a brief description.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
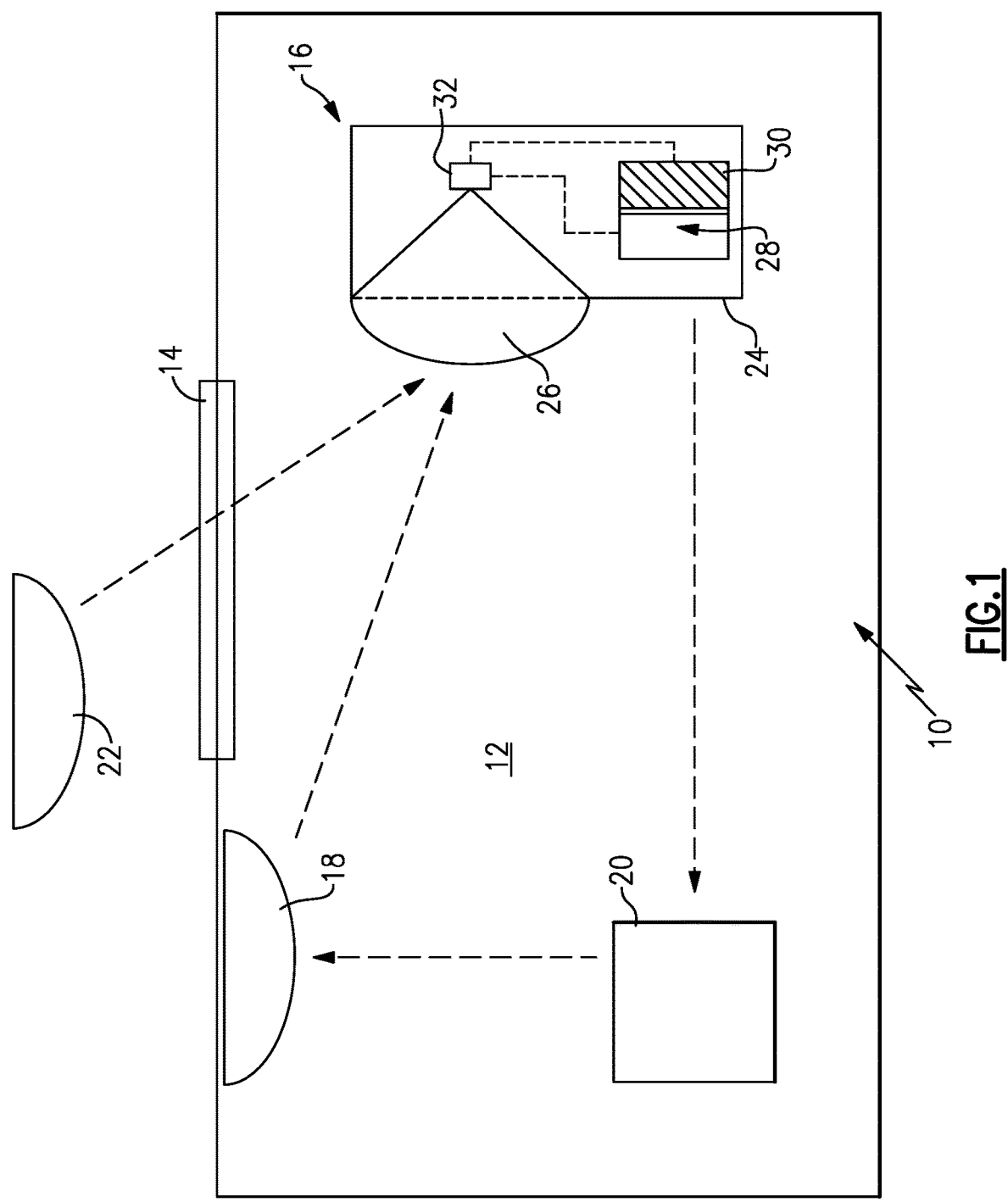
FIG. 1 schematically illustrates an example alarm system for use in an environment, such as a room.
Figure 2:
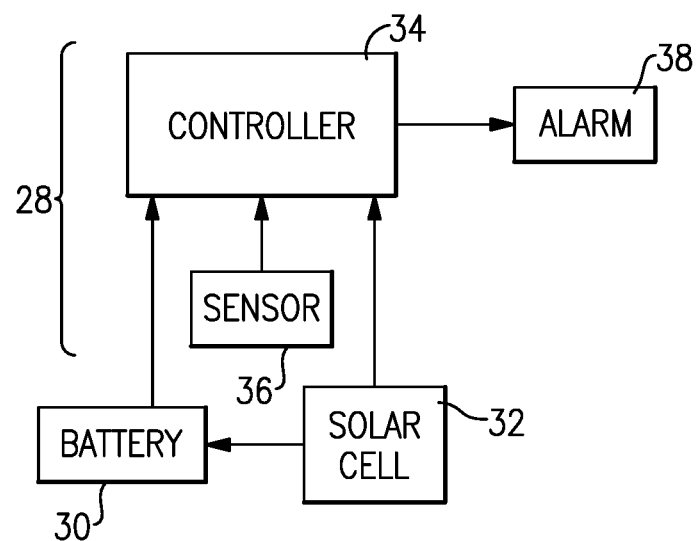
FIG. 2 schematically illustrates a detection engine of an alarm detector.

An alarm system 10 is schematically illustrated in FIG. 1. The system 10 is used in an environment 12 such as an interior room of a building, although the system may be used in other locations, such as outdoors. The system 10 includes a detector 16 arranged in the environment to detect an event, for example, an intrusion based upon glass breakage, vibration, noise, and/or motion. The detector 16 includes a housing 24 with a detection engine 28 that is configured to detect the event. Although the disclosed configuration in described with reference to an alarm detector, the recharging method and system may be used with other types of detectors.

A battery 30 supplies power to the detection engine 28. In the example, there is no hardwired power supplied to the detector 16, although hardwired may be provided in an installation where possible and desired.

A window 26 is provided on the housing 24 to permit light into the housing 24 from a light source 18 in the environment or another light source 22 outside the environment, such as natural light (i.e., sunlight). Arranging the solar cell 32 within the housing 24 protects the solar cell from impact and debris. A solar cell 32 is connected to the battery 30 and generates electricity to charge the battery 30 when exposed to a light received through the window 26. In the example shown in FIG. 1, the window 26 is a convex lens that is configured to concentrate light onto the solar cell 32, which may be a photo voltaic cell.

In an environment 12, where sufficient light is received from the light source 18 or the other light source 22 during normal operation of the detector 16, the solar cell 32 is able to sufficiently recharge the battery 30. However, during prolonged periods of darkness or low light, it may be necessary to expose the solar cell 32 to additional light to sufficiently charge the battery 30. To this end, the light source 18 may be selectively actuated by a light switch 20 in response to a signal from the detection engine 28. The detection engine 28 is configured to wireless send (e.g., over Bluetooth, wifi, etc.) a charging request, or an ON command, to the light switch 20 in response to a low battery condition associated with the battery 30 and/or a low-light condition detected by the solar cell 32.

The detection engine 28 includes a sensor 36 and an alarm 38. The sensor is configured to detect the event, such as an intrusion. The controller 34 is in communication with the battery 30 and the solar cell 32. The controller 34 is configured to generate the ON command in response to a low battery condition associated with the battery 30, as described above. In the example, the same controller 34 is used to control battery charging and detect the intrusion event, although more than one controller may be used, if desired. The controller 34 is configured to wirelessly send an OFF command to the light switch 20 in response to the battery 30 achieving a desired charge and/or sufficient light being detected by the solar cell 32.

Figure 3:
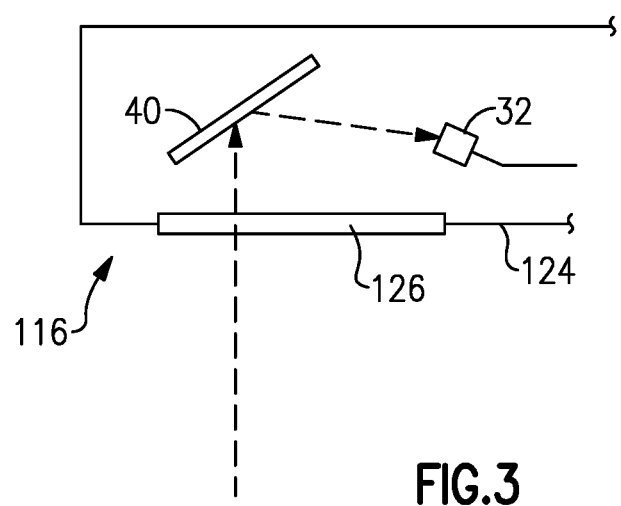
FIG. 3 schematically illustrates one example configuration for directing light to a solar cell used to charge a battery.

Another example detector 116 configuration is illustrated in FIG. 3. The housing 124 includes a window 126 that receives the light. The light is reflected by a mirror 40 within the housing 124 onto the solar cell 32.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A detector comprising:
   a housing having a window;
   a detection engine configured to detect an event external to the housing, wherein the detection engine includes an alarm and a sensor in communication with a controller, the sensor configured to detect an event corresponding to at least one of a glass breakage, a vibration, a motion and/or a noise, the controller activating the alarm in response to the event;
   a battery connected to the detection engine and configured to supply power thereto; and
   a solar cell configured to generate electricity when exposed to a light received through the window, the solar cell arranged in the housing and electrically connected to the battery, wherein the controller is in communication with the battery and the solar cell, the controller is configured to generate an ON command in response to a low battery condition associated with the battery and/or a low-light condition detected by the solar cell.

2. An alarm system comprising:
   a light source;
   a light switch in communication with the light source and configured to increase light from the source in response to an ON command; and
   a detector including:
   a housing having a window;
   a detection engine configured to detect an event external to the housing, the detection engine in communication with the light switch;
   a battery connected to the detection engine and configured to supply power thereto;
   a solar cell configured to generate electricity when exposed to a light received through the window, the solar cell arranged in the housing and electrically connected to the battery; and
   wherein the detection engine is configured to send the ON command to the light switch in response to a low battery condition associated with the battery and/or a low-light condition detected by the solar cell.

3. The alarm system of claim 2, wherein the window is a convex lens configured to concentrate the light onto the solar cell.

4. The alarm system of claim 2, wherein the solar cell is a photovoltaic cell.

5. The alarm system of claim 2, wherein the detection engine includes an alarm and a sensor in communication with a controller, the sensor configured to detect an event corresponding to at least one of a glass breakage, a vibration, a motion and/or a noise, the controller activating the alarm in response to the event.

6. The alarm system of claim 2, wherein the detection engine includes a controller configured to send an OFF command to the light switch in response to the battery achieving a desired charge.

7. The alarm system of claim 2, comprising a mirror arranged within the housing, the mirror oriented to direct the light from the window onto the solar cell.

8. The alarm system of claim 2, wherein the light command is a wireless signal to the light switch.

9. A method of operating an alarm detector comprising:
powering a detection engine with a rechargeable battery, wherein the detection engine is configured to detect an event corresponding to at least one of a glass breakage, a vibration, a motion and/or a noise;
recharging the battery with a solar cell; and
turning on a light source with the detection engine in response to a low battery condition associated with the battery and a low-light condition detected by the solar cell, wherein the turning on step is performed wirelessly.

10. The method of claim 9, wherein the recharging step includes concentrating a light onto the solar cell.

11. The method of claim 9, wherein the detection engine includes an alarm and a sensor in communication with a controller, comprising the steps of detecting with the sensor an event corresponding to at least one of a glass breakage, a vibration, a motion and/or a noise, and activating the alarm in response to the event.

12. The method of claim 9, comprising the step of sending an OFF command to a light switch in response to the battery achieving a desired charge.

13. The method of claim 9, wherein the recharging step includes directing a light onto a mirror, and reflecting the light with the mirror onto the solar cell.

* * * * *